Aug. 15, 1961  J. E. FRICK  2,995,876
AUTOMATIC GLASS EDGING MACHINE
Filed Aug. 25, 1958  3 Sheets-Sheet 1

INVENTOR.
JACK E. FRICK
BY
Lyon+Lyon
ATTORNEYS

INVENTOR.
JACK E. FRICK
BY
ATTORNEYS

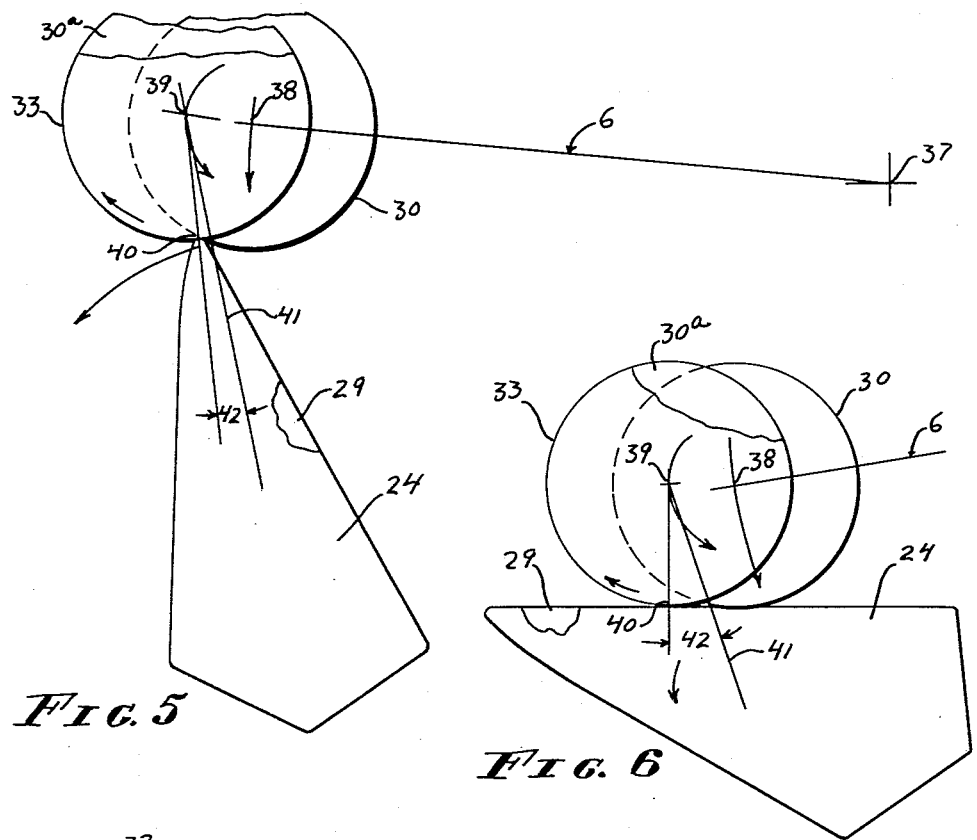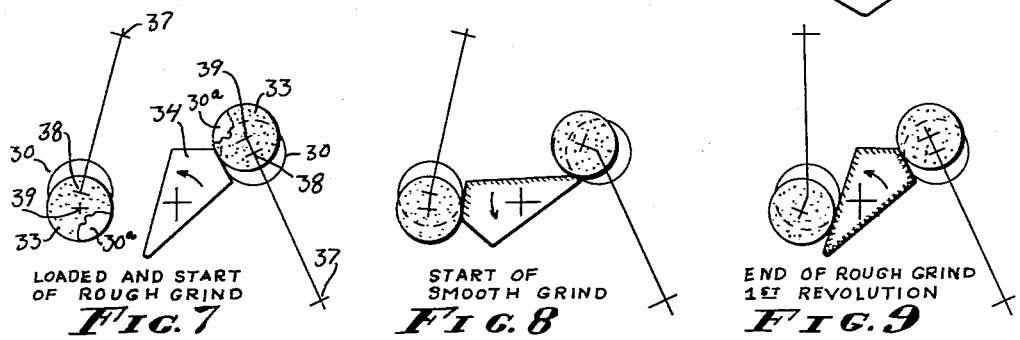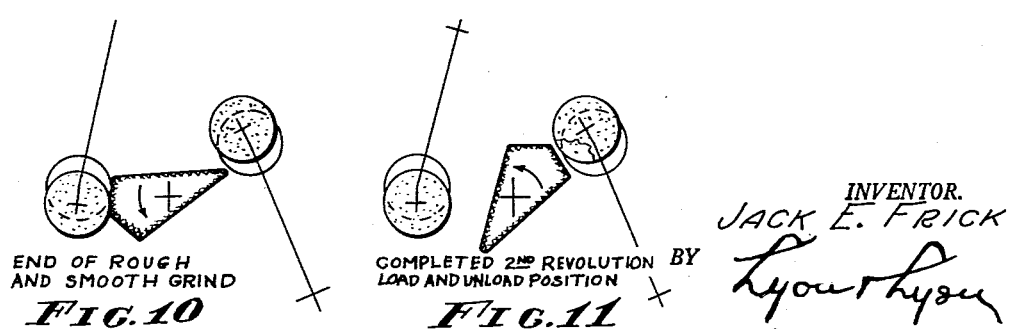

United States Patent Office 2,995,876
Patented Aug. 15, 1961

2,995,876
AUTOMATIC GLASS EDGING MACHINE
Jack E. Frick, Glendale, Calif., assignor to Weber Showcase & Fixture Co., Inc., Los Angeles, Calif., a corporation of Delaware
Filed Aug. 25, 1958, Ser. No. 756,911
5 Claims. (Cl. 51—101)

This invention relates to automatic glass edging machines, and included in the objects of this invention are:

First, to provide an automatic glass edging machine which is particularly adapted for edging glass workpieces having acute corners, the machine incorporating novel means whereby the point of contact of the edging wheel with the glass workpiece is maintained rearwardly or in trailing relation with a line between the axes of rotation of the edging wheel and the axis of rotation of the glass workpiece, even during passage of the edging wheel about an acute corner, so that the grinding or edging operation proceeds without chatter or vibration throughout the periphery of the glass workpiece.

Second, to provide an automatic glass edging machine wherein the pressure exerted by the grinding or edging wheel against the glass workpiece is maintained at a substantially constant value throughout the periphery of the glass workpiece, even around acute corners.

Third, to provide an automatic glass edging machine which comprises a primary pivotable frame having a tracer wheel adapted to follow a template located in coaxial registry with the glass workpiece, and a secondary pivotable frame carried by the primary pivotable frame and provided with a grinding or edging wheel, the point of contact of the edging wheel with the glass workpiece being disposed in trailing, but close coupled, relation with the point of contact of the tracer wheel with the template.

Fourth, to provide a glass edging machine which, on placing the glass workpiece in position and then permitting the workpiece to rotate with the edging wheel in contact therewith, can be depended upon to pass through a cycle of operation without further attention.

Fifth, to provide an automatic glass edging machine which may be arranged as a dual machine, carrying a rough and a fine edging wheel arranged to follow in tandem about a glass workpiece, so that rough and final grinding may take place with one handling of the workpiece.

With the above and other objects in view, as may appear hereinafter, reference is directed to the accompanying drawings in which:

FIGURE 5 is a diagrammatical view showing the relationship of the axes of the template tracer wheel and edging wheel, as the edging wheel passes over an acute corner of a workpiece;

FIGURE 6 is a similar diagrammatical view showing the relationship of these axes when edging a straight edge of the workpiece;

Figure 1:
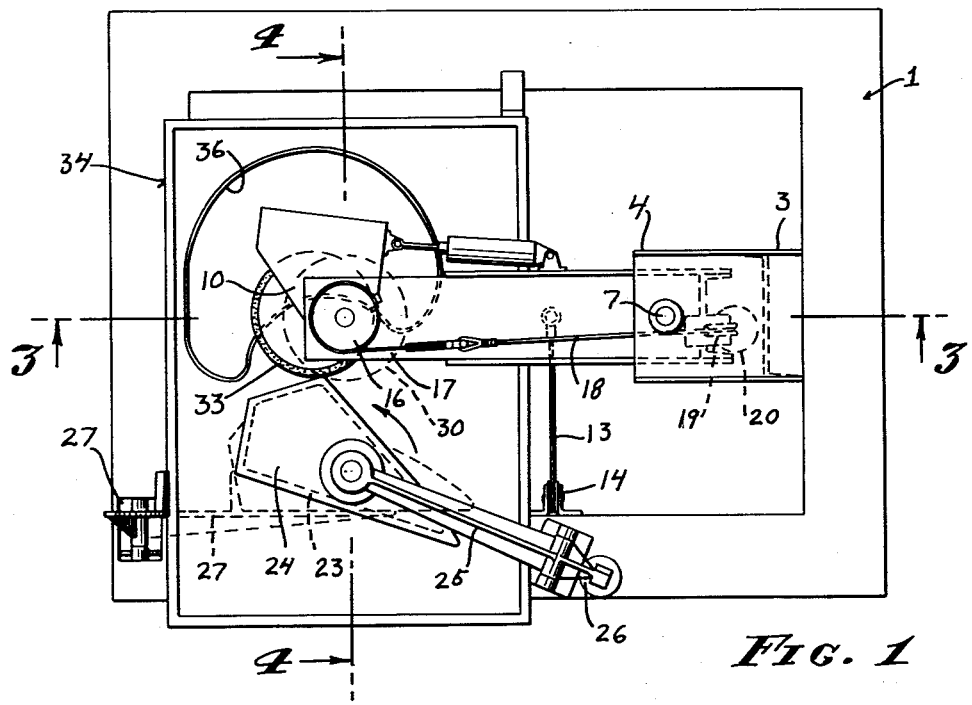
FIGURE 1 is a plan view of the automatic glass edging machine.

FIGURES 7, 8, 9, 10, and 11 are diagrammatical views, showing the manner in which a roughing and finishing edging unit may be employed in sequence on a single workpiece.

The automatic glass edging machine is mounted on a table structure 1 which may be in the form of a rectangular tubular frame. The table structure 1 is supported by legs 2. Extending upwardly from one margin of the table structure 1 is a mounting post 3, which is provided with an upper bracket 4 and a lower bracket 5 projecting into the rectangular space defined by the table structure.

A primary frame 6 is pivotally supported between the brackets 4 and 5 by journal means 7. The primary frame 6 includes horizontal arms 8 at its upper and lower extremities which project across the table structure 1.

A secondary frame 9 having relatively short upper and lower horizontal arms 10 is journaled between the horizontal arms 8 of the primary frame 6 by means of an upper journal post 11 and a lower journal post 12.

The primary frame 6 is adapted to be biased so as to pivot in a counterclockwise direction as viewed in FIGURE 1. This is accomplished by means of a cable 13 which passes over a pulley 14 and is attached to a weight 15.

Similarly, the secondary frame 9 is biased so that it tends to pivot in a counterclockwise direction by means of a wheel 16 mounted on the upper journal post 11, around which is partially wrapped a strap or chain 17 which is attached to a cable 18.

The cable 18 extends along the upper horizontal arm 8, passes over a pulley 19, and is attached to a weight 20 which may hang between the vertical portion of the primary frame 6 and the mounting post 3.

The primary frame 6 and secondary frame 9 may be interconnected by a retracting and dampening cylinder unit 21 which tends to rotate the secondary frame in a clockwise direction in opposition to the biasing force exerted by the weight 20.

Suitably supported and rotated by means, not shown, under the table structure 1 is a workpiece supporting shaft 22. Mounted on the upper end of the shaft 22 is a supporting plate 23 adapted to carry a glass workpiece 24. The supporting plate 23 is preferably shaped in conformity with the contour of the workpiece 24. For purposes of illustration, the workpiece is shown as a wind wing or vent window used in motor vehicles, and is shown as having a configuration which includes an acute angle.

The workpiece 24 may be held in place by suction, or may be clamped, for example, by means of a clamp arm 25 controlled by a suitable operating cylinder 26. The clamp arm 25 is adapted to be pivoted to an out-of-the-way position to permit loading and unloading of the workpiece. In order to locate the workpiece 24 in proper position on the supporting plate 23, a positioning fixture 27 mounted on a pedestal 28 at one side of the workpiece may be employed.

Mounted on the workpiece supporting shaft 22 is a template 29 which is preferably identical in contour and dimension to the finished workpiece. The template 29 is adapted to be engaged by a template tracer wheel 30 carried by the lower journal post 12.

Mounted on the secondary frame 9 by means of mounting brackets 31 is a motor drive unit 32 having a vertical downwardly directed shaft, at the lower end of which is secured a grinding or edging wheel 33. The effective diameters of the grinding or edging wheel and the template tracer wheel 30 are preferably substantially the same, but need not be identical; thus allowing optimum refacing of the edging wheel.

Also mounted on the secondary frame 9, below the edging wheel 33, is a bracket 9a which carries a second tracer wheel 30a which also engages the template 29. The axis of the second tracer wheel 30a coincides with the axis of the edging wheel 33, and is equal in diameter to the effective diameter of the edging wheel. The second tracing wheel 30a limits the depth of cut made by the edging wheel 33. Some latitude is allowable in the identity of diameters of the edging wheel 33 and its cut limiting tracer wheel 30a to permit refacing of the edging wheel. The bracket 9a is thus adjustable by means, such as shims or spacing washers 9b between the bracket and the frame 9, to bring the contacting point of the cut limiting wheel into vertical coincidence with the edging wheel.

The workpiece 24 is surrounded by a pan 34 having an aperture 35 for the shaft 22 and a clearance aperture 36 for the secondary frame 9.

The journal means 7, which pivotally connects the primary frame 6 with the mounting post 3, defines a primary axis 37 indicated in the diagrammatical views of FIGURES 5 to 11. The journal posts 11 and 12 which connect the secondary frame to the primary frame define a secondary axis 38. The axis of the motor drive unit 32 and edging wheel 33 define a tertiary axis 39 which is offset from the secondary axis 38 a short distance in a direction opposite from the primary axis 37.

Operation of the automatic glass edging machine is as follows:

The glass workpiece 24 is placed on the supporting plate 23 in proper position and orientation by use of the positioning fixture 27, which is folded to the dotted line position shown in FIGURE 1. During this loading operation, the supporting shaft 22 is not rotating and the retracting cylinder 21 is operative to hold the grinding or edging wheel 33 clear of the workpiece.

Figure 2:
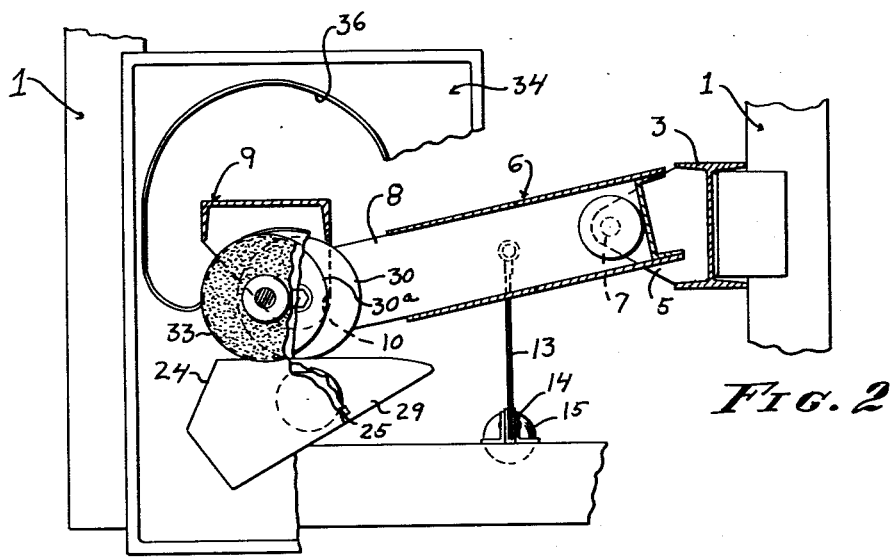
FIGURE 2 is a fragmentary, sectional view through 2—2 of FIGURE 3.
Figure 3:
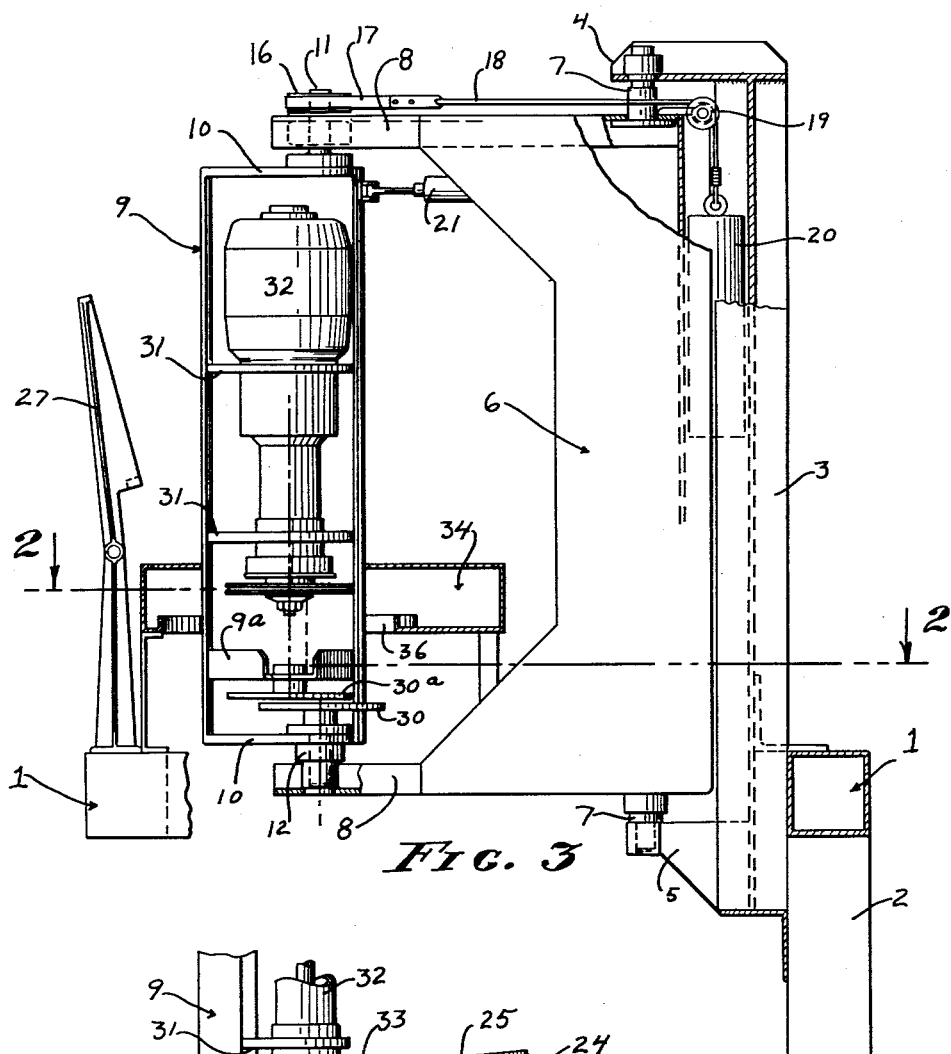
FIGURE 3 is a partial elevational partial vertical, sectional view through 3—3 of FIGURE 1.
Figure 4:
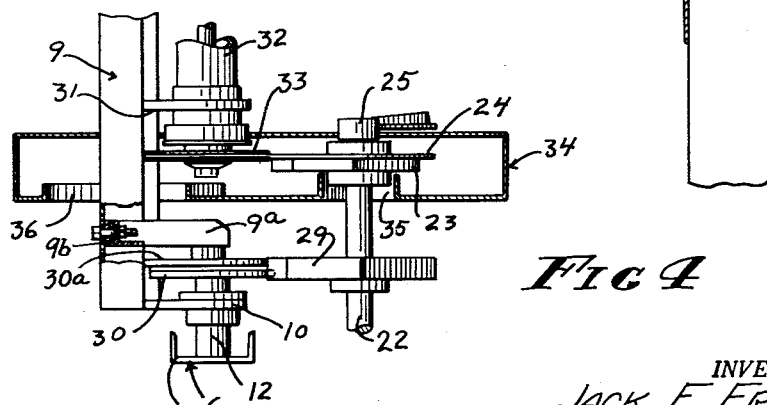
FIGURE 4 is a fragmentary, transverse, sectional view through 4—4 of FIGURE 1.

After the workpiece 24 has been positioned, the shaft 22 is rotated slowly in a counterclockwise direction, as viewed in FIGURES 1 and 2 as well as in the diagrammatical views, FIGURES 5 to 11. The retracting cylinder unit 21 is operated to release the grinding or edging wheel 33 so that it and the cut limiting tracer wheel 30a are brought controllably into engagement with the edge of the workpiece 24 and the template 29, respectively.

The edging wheel 33 is brought up to speed before contacting the workpiece 24, or is rotated continuously in a clockwise direction, as viewed in FIGURES 1 and 2 and the diagrammatical views, FIGURES 5 to 11. Thereupon, the biasing force exerted by the weight 15 maintains the tracer wheel 30 in engagement with the template 29 while the biasing force exerted by the weight 20 maintains the edging wheel 33 and cut limiting tracer wheel 30a in engagement with the edge of the workpiece 24 and template 29, respectively.

It will be noted that by reason of the relative relationship of the secondary axis 38 and tertiary axis 39, the grinding or edging wheel 33 and its cut limiting wheel 30a trail the template tracer wheel 30. As a consequence, the point of contact 40 between the edging wheel and the workpiece 24, as indicated in FIGURES 6 and 7, is rearward; that is, trails a line designated 41 extending between the axis of the edging wheel 33 and the axis of rotation of the shaft 22 and workpiece 24. There is thus formed what is termed a "positive" angle designated 42 between a line drawn through the contact 40, the axis of the edging wheel 33, and the line 41. That is, for the clockwise direction of rotation of the wheel, the point of contact 40 trails the line 41.

While the angle 42 may vary in magnitude, it remains a positive angle even when the edging wheel 33 and its cut limiting wheel 30a pass over an acute corner of the workpiece 24 and template 29, as indicated in FIGURE 5. As a consequence, the resulting forces tend to maintain the edging wheel in chatter-free contact with the edge of the workpiece. Furthermore, until the cut limiting wheel 30a engages the template to limit further depth of cut, the contact pressure between the edging wheel and the workpiece is dependent upon the force exerted by the weight 20. This force is constant.

Thus the grinding operation is a uniform one throughout the periphery of the workpiece 24, irrespective of the contour or the passage of the edging wheel 33 about corners of the workpiece. It therefore follows that the workpiece may be cut exactly to the desired contour of the finished piece, allowing for a uniform grinding operation around its entire periphery.

Due to the fact that the grinding or edging operation progresses without chatter, and due to the fact that the grinding effect is substantially uniform throughout the periphery of the workpiece, operator control of the edging operation is not needed once the edging operation is commenced. Consequently, the entire edging operation may be completed automatically, and it is merely necessary for the operator to remove the completed workpiece and place a new one in its stead.

It is also possible to provide for two grinding operations to proceed simultaneously on a single workpiece. For example, a rough grinding or edging operation may be started, then the final edging operation commenced before the rough edging operation is complete.

Thus, as indicated diagrammatically in FIGURES 7 to 11, two edging units including the tracer wheels 30 and 30a and edging wheel 33 may be mounted for engagement with a common workpiece. In this case one unit having a roughing edging wheel is first brought into operation, and then, as the point of commencement passes, the second unit carrying a finishing edging wheel may be brought into operation to complete the cycle without removing the workpiece from its mounting.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. An automatic glass edging machine, comprising: means for rotating a glass workpiece to be edged; a template having a configuration corresponding to said workpiece and rotatable therewith; a template follower; a primary frame supporting said follower and pivotably mounted about an axis remote from said workpiece; means biasing said frame to urge said follower into engagement with said template; a secondary frame pivotably supported from said primary frame for movement about an axis approximately coinciding with the axis of said follower; an edging wheel carried by said secondary frame and rotatable about an axis offset from the pivotal axis of said secondary frame; means biasing said secondary frame to urge said edging wheel into engagement with said workpiece at a point offset from the point of engagement of said follower with said template; and means for limiting the depth of cut of said edging wheel.

2. An automatic glass edging machine, comprising: a primary frame pivotable about a first axis; a secondary frame pivotably supported by said primary frame for movement about a second axis parallel to said first axis; a first template follower rotatable about said second axis; an edging wheel carried by said secondary frame for rotation about a third axis parallel to said second axis; a second template follower also carried by said secondary frame; means for supporting a glass workpiece and a template of similar configuration for rotation about a fourth axis; and means for urging said template followers and edging wheel into engagement with said template and workpiece, respectively.

3. An automatic glass edging machine, comprising: means for rotating a glass workpiece to be edged; a template having a configuration corresponding to said workpiece and rotatable therewith; a first template follower; a first means for urging said follower against said template; an edging wheel; a second template follower; a second means pivotally connected to said first means for urging said edging wheel into engagement with said workpiece and said second follower into engagement with said template, said edging wheel and second template follower being disposed in trailing relation with said first template follower in respect to the direction of rotation of said workpiece and said first template follower.

4. An automatic glass edging machine, comprising: means for rotatably supporting a glass workpiece; a template carried by said means and rotatable with said workpiece about its axis of rotation, said template having substantially the same configuration as said workpiece; a rotatable template follower; means for urging said follower against said template; means pivotably supported in substantial coincidence with the axis of rotation of said template follower and defining a displaced axis; an edging wheel disposed for rotation about said displaced axis; and means for rotatably supporting said edging wheel.

5. An automatic glass edging machine, comprising: means for rotatably supporting a glass workpiece; a template carried by said means and rotatable with said workpiece about its axis of rotation, said template having substantially the same configuration as said workpiece; a rotatable template follower engageable with said template; a rotatable edging wheel engageable with said workpiece; template follower supporting means disposing said template follower for movement about a pivotal axis displaced from its axis of rotation; edging wheel supporting means disposing said edging wheel for movement about a pivotal axis displaced from its axis of rotation, the pivotal axis of said edging wheel substantially coinciding with the axis of rotation of said template follower, and said edging wheel axis disposed in trailing relation to said template follower axis with respect to the direction of rotation of said workpiece and template; a cutting depth limiting template follower engageable with said template in approximal coincidence with the point of contact of said edging wheel, and a support for said cutting depth limiting template.

References Cited in the file of this patent

UNITED STATES PATENTS

| | | |
|---|---|---|
| 2,597,180 | Reaser et al. | May 20, 1952 |
| 2,883,800 | Reaser et al. | Apr. 28, 1959 |